United States Patent [19]
Kusumi et al.

[11] Patent Number: 5,433,396
[45] Date of Patent: Jul. 18, 1995

[54] RECORDING AND/OR REPRODUCING APPARATUS HAVING A SLIDER MEANS FOR BRAKING REEL-DRIVING MECHANISMS

[75] Inventors: Ryuji Kusumi, Kanagawa; Yukiko Narumi, Tokyo, both of Japan

[73] Assignee: Sony Corporation, Tokyo, Japan

[21] Appl. No.: 96,344

[22] Filed: Jul. 22, 1993

[30] Foreign Application Priority Data

Aug. 10, 1992 [JP] Japan ................. 4-212809

[51] Int. Cl.⁶ .............................................. G11B 15/22
[52] U.S. Cl. ............................................... 242/338.1
[58] Field of Search ................ 242/338, 338.1, 339, 242/349, 356; 360/74.3, 96.1, 96.3

[56] References Cited

U.S. PATENT DOCUMENTS

| | | | |
|---|---|---|---|
| 4,635,146 | 1/1987 | Koda et al. | 360/96.3 |
| 4,708,302 | 11/1987 | Yamaguchi et al. | 360/96.3 |
| 4,730,792 | 3/1988 | Jang | 360/96.3 |
| 4,747,564 | 5/1988 | Tsubota | 360/96.3 |
| 5,209,427 | 5/1993 | Yamaguchi et al. | |
| 5,217,180 | 6/1993 | Ruyten et al. | 242/356 X |
| 5,318,241 | 6/1994 | Morimoto | |

*Primary Examiner*—John P. Darling
*Attorney, Agent, or Firm*—Lise A. Rode; Robert P. Biddle; Jerry A. Miller

[57] ABSTRACT

A reel base braking mechanism for a reel base of a video tape recorder in which the number of assembly parts can be reduced and an accurate braking timing can be obtained by employing a so-called one-way mechanism using a plane cam. In a ganged relation with a slide operation of a slide plate on which a plane cam formed of first and second guide grooves is formed when a tape loading and tape unloading are carried out, a pin of a braking arm is selectively engaged with the first and second guide grooves to rotate the braking arm to control the timing at which said supply-reel base is operated with brakes-on and off.

6 Claims, 4 Drawing Sheets

FIG. 5

| Mode | EJECT | UNLOAD END | STOP 1 | HALF LOAD | DEW | LOAD END | STOP 2 | FWD | FWD.P | RVS.P | RVS |
|---|---|---|---|---|---|---|---|---|---|---|---|
| Explanation of Mode | Cassette Ejected | Cassette Unloaded | Tape Stopped At REW Position | Tape At REW Position | Dew Detected | Loading Ended | Tape Travel Stopped | PLAY CUE (Variable Tape Speed Playback) | Slow Playback FWD Pause | Reverse Pause | REV (Reverse Variable Tape Speed Playback) |
| Braking Arm — Loading | On | Off | Off | Off | On | Off | Off | Off | Off | Off | Off |
| Braking Arm — Un-loading | On | On | On | On | On | Off | Off | Off | Off | Off | Off |
| Explanation of Operation | Prevent Tape From Being Drawn From Tape Cassette When Power Switch is in Its off State | Permit Pendulum Gear To Be Meshed With Supply Reel So That Pendulum Gear Serves As Brake Upon Loading | | | Prevent Tape From Being Drawn From Tape Cassette When Dew Is Detected | Tape Loading Ended | Reel Base With Brakes Off Because Of Tape Travel Modes Such As PB (Playback), STOP, CUE, REV. | | | | |

← Tape Loading (Move Slide Plate Rightward) | (Move Slide Plate Leftward) Tape Unloading →

RECORDING AND/OR REPRODUCING APPARATUS HAVING A SLIDER MEANS FOR BRAKING REEL-DRIVING MECHANISMS

BACKGROUND OF THE INVENTION

1. Field of the Invention

The present invention relates to a reel base braking mechanism suitably applied to a video tape recorder (VTR) or the like.

2. Description of the Prior Art

Conventional reel base braking mechanisms include braking mechanisms that are exclusively designed to load and unload a tape. The breaking mechanism also is provided with a mechanism for braking the reel base depending upon the rotational direction of a loading motor.

The aforesaid conventional reel base braking mechanisms suffer from a braking timing that is very complicated because the braking mechanism is requested to brake the reel base in any of modes such as a tape loading operation mode, a tape running mode or the like. Further, the braking time of the braking mechanism becomes different under various conditions such as when the tape is loaded or unloaded and the like. For this reason, the conventional braking mechanism becomes complicated in structure. In addition, the conventional braking mechanism has a number of assembly parts and a braking time thereof tends to fluctuate.

OBJECTS AND SUMMARY OF THE INVENTION

Therefore, it is an object of the present invention to provide an improved reel base braking mechanism in which the aforesaid shortcomings and disadvantages encountered with the prior art can be eliminated.

More specifically, it is an object of the present invention to provide reel base braking mechanism in which the number of assembly parts can be reduced by using a one-way mechanism.

It is another object of the present invention to provide a reel base braking mechanism which can be produced very inexpensively.

It is a further object of the present invention to provide a reel base braking mechanism in which an accurate braking timing can be obtained by using a one-way mechanism.

It is yet a further object of the present invention to provide a reel base braking mechanism which is high in reliability.

According to an aspect of the present invention, there is provided a reel base braking mechanism which comprises a slide plate sliding on a chassis in the directions opposite to each other in a straight line fashion in a ganged relation with a tape loading operation and a tape unloading operation, a plane cam mechanism formed on the slide plate along the sliding direction of the slide plate and having at least common first and second guide grooves at respective ends, and a braking arm rotatably supported to the chassis and having a pin formed on one end portion thereof to be engaged with the guide mechanism of the plane cam mechanism and a click portion formed on the other end portion thereof to be engaged or detached from a reel base, wherein the click portion of the braking arm is engaged with or detached from the reel base with the brakes on or with the brakes off in a ganged relation with the pin of the braking arm which is selectively engaged with the two guide grooves to swing when the slide plate is moved in a straight line fashion, thereby controlling the brakes on and brakes off timing of the reel base in response to positions of respective modes of the tape loading and the tape unloading.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIG. 5 is a table showing a relationship among braking time of a supply-reel base and modes in loading operation and unloading operation.

DETAILED DESCRIPTION OF THE PREFERRED EMBODIMENT

An embodiment of the present invention will hereinafter be described with reference to the drawings.

Figure 1:
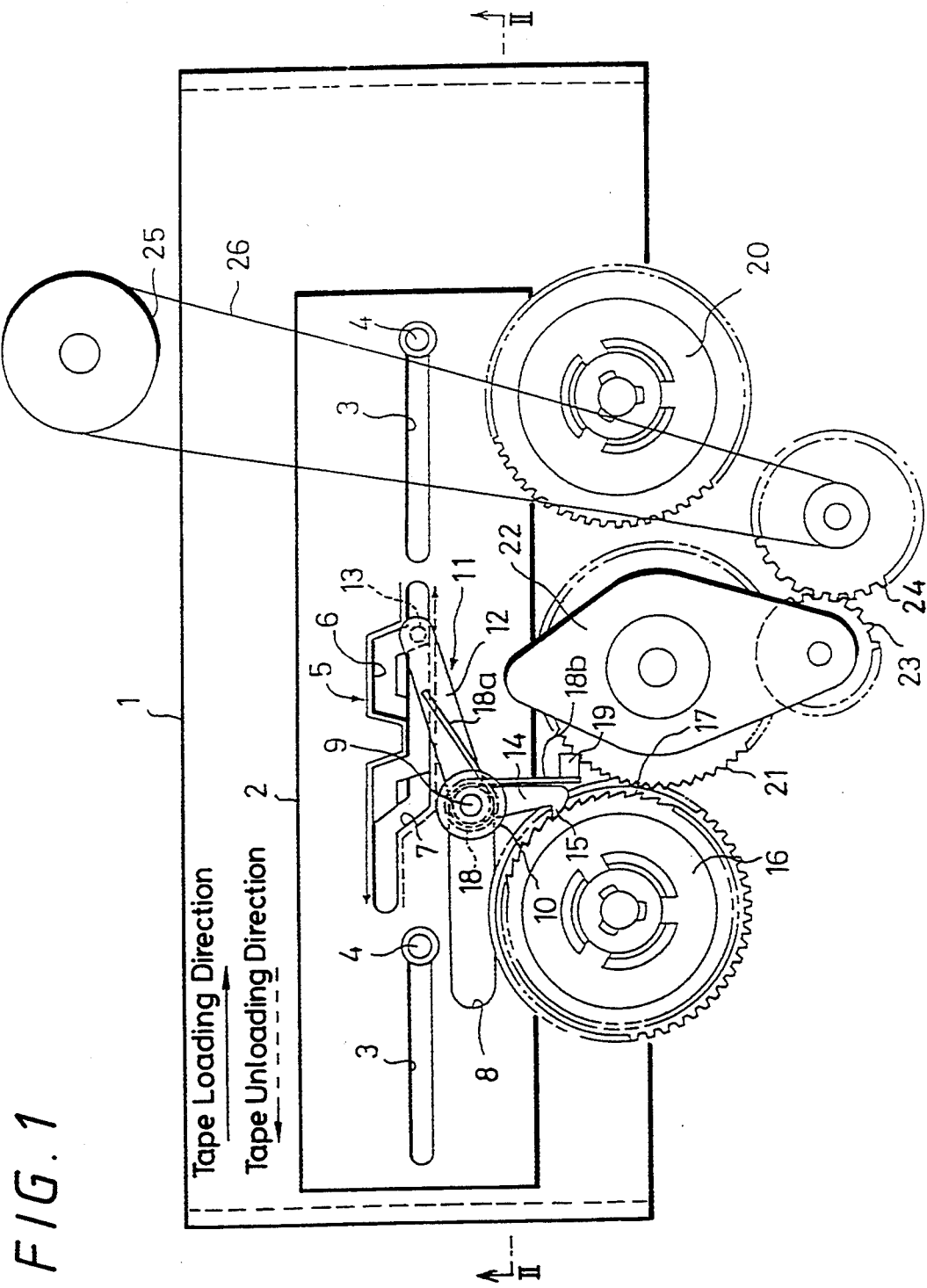
FIG. 1 is a plan view illustrating an embodiment of a reel base braking mechanism according to the present invention.
Figure 2:
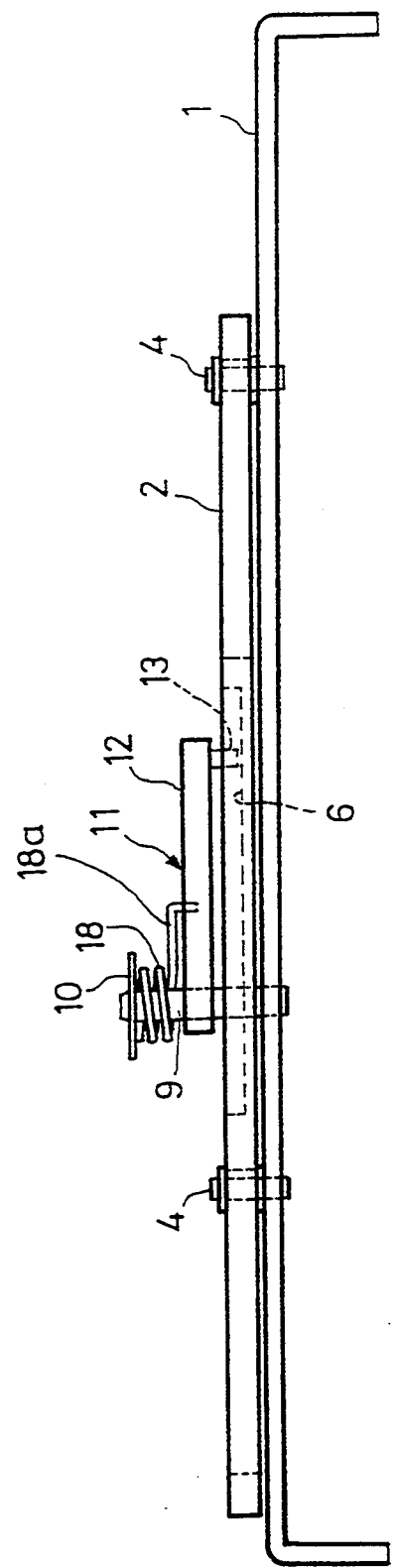
FIG. 2 is a schematic sectional view taken along the line II—II in FIG. 1.

FIG. 1 of the accompanying drawings shows a plan view of an embodiment of a reel base braking mechanism according to the present invention. FIG. 2 is a cross-sectional side view taken along the line II—II in FIG. 1.

As shown in FIGS. 1 and 2, there is provided a so-called mechanical chassis 1 on which a slide plate 2 is slidably provided. The slide plate 2 has two rectangular apertures 3, 3 bored through its two end portions along the central longitudinal direction thereof. Guide shafts 4, 4 projected from the mechanical chassis 1 are inserted into the rectangular apertures 3, 3 so that the slide plate 2 becomes slidable in the directions shown by arrows, i.e., in the direction shown by a solid arrow in FIG. 1 in the tape loading operation, which will be described later on, or in the direction shown by a dashed arrow in FIG. 1 in the tape unloading operation. A slide driving means for moving the slide plate 2 will not be described herein.

The slide plate 2 has formed at its central portion a plane cam mechanism 5 along the sliding direction of the slide plate 2. The plane cam mechanism 5 has a configuration of a cam formed of first and second winding guide grooves 6, 7 of concave configurations. The first guide groove 6 is used in the tape loading operation and has a cam shape shown by a solid arrow in FIG. 1. The second guide groove 7 is used in the tape unloading operation and has a cam shape shown by a dashed arrow in FIG. 1. Accordingly, the first and second guide grooves 6, 7 are made common at their end portions and intermediate portions.

Figure 3:
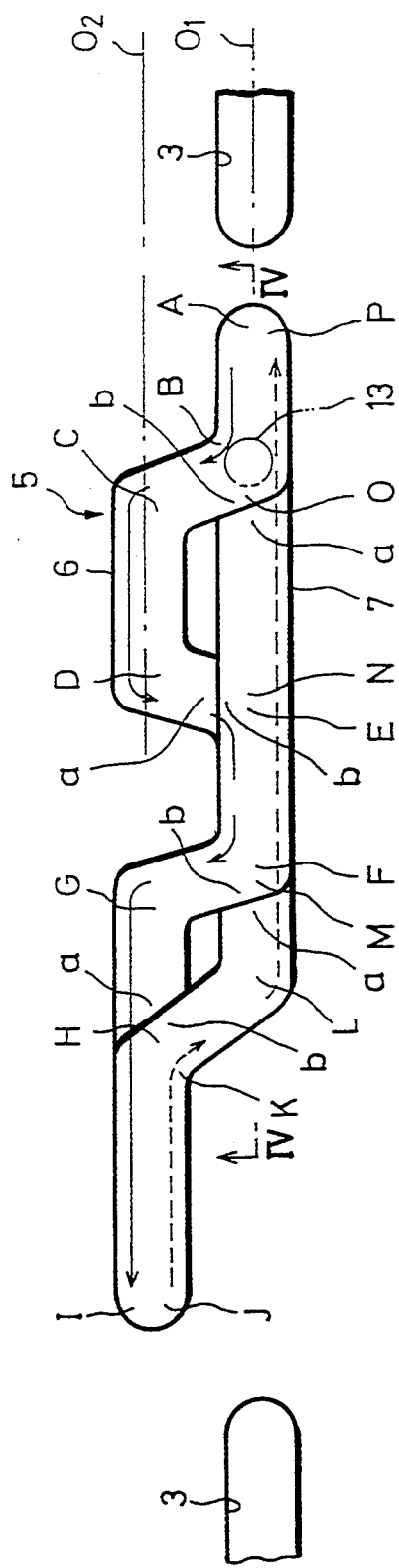
FIG. 3 is a plan view illustrating a shape of a plane cam mechanism in an enlarged scale.
Figure 4:
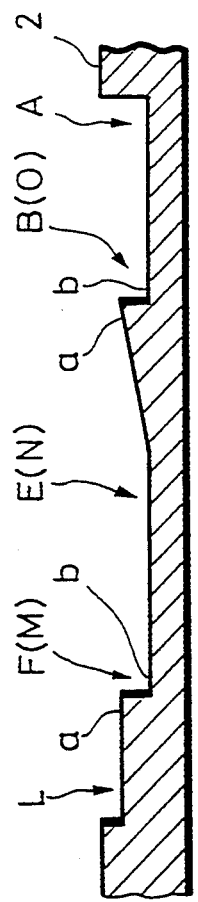
FIG. 4 is a schematic sectional view taken along the line IV—IV in FIG. 3.

The above-mentioned plane cam mechanism 5 will be described more fully with reference to FIGS. 3 and 4.

The first guide groove 6 is laid on a first center line $O_1$ of the rectangular aperture 3 in a range from a point A serving as a starting point of the loading operation to a point B. The first guide groove 6 is curved toward a second center line $O_2$ parallel to the center line $O_1$ in a range from the point B to a point C and is laid on the second center line $O_2$ in a range from the point C to a point D. Further, the first guide groove 6 is curved toward the first center line $O_1$ side in a range from the point D to a point E and is laid on the first center line $O_1$ in a range from the point E to a point F. Furthermore, the first guide groove 6 is curved toward the second center line $O_2$ side in a range from the point F to a point G and is laid on the second center line $O_2$ in a range from the point G through a point H to a point I serving as the other end portion of the guide groove 6.

The second guide groove 7 is laid on the common second center line $O_2$ from a point J serving as a starting point of the unloading operation to a point K that is common to the range from the point H to the point I of the first guide groove 6. The second guide groove 7 is curved toward the first center line $O_1$ side in a range from the point K to a point L and laid on the first center line $O_1$ from the point L to a point M. Further, the second guide groove 7 is laid in a range of the point M to a point N on the first center line $O_1$ which is common to the point E to the point F of the first guide groove 6. Furthermore, the second guide groove 7 is laid on the first center line $O_1$ in a range from the point N to a point O and laid in a range from the point O to a point P on the first center line $O_1$ which is common to the point A to the point B of the first guide groove 6. In addition, the branching portions of the first and second guide grooves 6, 7 are formed such that a point b is made lower than a point a.

Referring back to FIGS. 1 and 2, the thus formed slide plate 2 has a guide aperture 8 bored therethrough along the slide direction thereof. An arm shaft 9 projected above the mechanical chassis 1 is projected onto the slide plate 2 through the guide aperture 8, and a washer 10 is attached to the upper end of the arm shaft 9. The arm shaft 9 pivotally supports a braking arm 11 of substantially an L-shape. A pin 13 is attached to the rear surface of the top portion of a first arm 12 of the braking arm 11. The pin 13 is in engagement with the first guide groove 6. A click portion 15 is attached to the top porion of a second arm 14 of the braking arm 11. The click portion 15 can be engaged with and detached from a spur gear 17 formed around the outer periphery of a supply-reel base 16. Under the condition that the click portion 15 is in engagement with the spur gear 17, the supply-reel base 16 cannot be rotated in the tape supply direction and can be rotated in the tape rewinding direction, whereby the tape slack can be removed.

The arm shaft 9 includes a torsion spring 18 interposed between the braking arm 11 and the washer 10. One end 18a of the torsion spring 18 is fixed to the first arm 12 and the other end 18b of the torsion spring 18 is fixed to a supporting member 19 provided on the mechanical chassis 1, whereby the braking arm 11 is biased under spring force of the torsion spring 18 so that the click portion 15 of the second arm 14 is engaged with the spur gear 17 of the supply-reel base 16. Moreover, the torsion spring 18 biases the braking arm 11 toward the slide plate 2 side under spring force of the torsion spring 18 so that the pin 13 formed on the first arm 12 is urged against the first guide groove 6 side.

There is provided a take-up reel base 20 which forms a pair together with the supply-reel base 16. A so-called pendulum gear 21 is disposed between the supply-reel base 16 and the take-up reel base 20. The pendulum gear 21 can be engaged with and detached from the spur gear 17 of the supply-reel base 16. The pendulum gear 21 is supported through an arm 22 to a gear 23 serving as a point about which the pendulum gear 21 swings like a pendulum. The gear 23 is meshed with a transmission gear 24 and the transmission gear 24 is rotated by a capstan gear 25 through a belt 26. When the supply-reel base 16, for example, is with the brakes on by the pendulum gear 21, the transmission gear 24 is rotated by the rotation of the capstan gear 25 through the belt 26 and the pendulum gear 21 is detached from the supply-reel base 16 by the gear 23 meshed with the transmission gear 24 and the supply-reel base 16 can be set with the brakes off.

The loading and unloading operations of the plane cam mechanism 5 and the braking arm 11 act as follows.

The loading operation will be described first.

When the pin 13 of the first arm 12 is located between the point A and the point B in the guide groove 6 under the condition that the slide plate 2 is at the loading start position as shown in FIG. 1, the click portion 15 of the second arm 14 is engaged with the spur gear 17 of the supply-reel base 16, whereby the supply-reel base 16 is with the brakes on. Then, when the loading is started from this state so that the slide plate 2 is slid in the direction shown by the solid arrow, the pin 13 is moved along the inclined groove from the point B to the point C because the depth of the groove is deeper at the point b than at the point a in the point B of the first guide groove 6. The pin 13 is then moved to the portion of the first guide groove 6 of the point D from the point C. That is to say, since the pin 13 is moved from the first center line $O_1$ to the second center line $O_2$ of the first guide groove 6, the braking arm 11 is rotated in the counter-clockwise direction, whereby the click portion 15 of the second arm 14 is detached from the spur gear 17, thus the supply-reel base 16 is set with the brakes off.

When the slide plate 2 is moved further along the direction shown by the solid arrow, the pin 13 is moved along the inclined groove from the point D of the first guide groove 6 to point E because the depth of the point b is larger than the point a and at that point. Accordingly, the pin 13 is moved to the first guide groove 6 of the first center line $O_1$ again so that the supply-reel base 16 is with the brakes on. Then, since the depth of the groove is larger at the point b than the point a with respect to the point F, the pin 13 is moved in the inclined groove from the point F to the point G and moved along the second center line $O_2$ at the point G, whereby the supply-reel base 16 is set with the brakes off. Then, the pin 13 is moved along the second center line $O_2$ from the point H to the point I of the loading end position. Thus, the supply-reel base 16 is continuously set with the brakes off.

The unloading operation will be described below.

In the unloading operation, the point J of the second guide groove 7 that is common to the first guide groove 6 becomes the unloading start position. At this time, the supply-reel base 16 is set with the brakes off. That is to say, in the unloading operation, the slide plate 2 is slid in the direction shown by the dashed arrow. Therefore, the pin 13 is moved on the second center line $O_2$ from the point J to the point K under the condition that the supply-reel base 16 is with the brakes off and moved on the first center line $O_1$ at the point L. Thus, the supply-reel base 16 is set with the brakes on. Then, the pin 13 is passed through the points M, N and O on the first center line $O_1$ and continuously moved under the condition that the supply-reel base 16 is set with the brakes on. Then, the pin 13 reaches the point P common to the point A of the above-mentioned loading starting position. Thus, a series of operation is ended.

FIG. 5 is a table showing a relationship among the braking time of the supply-reel base and respective modes in the loading operation and in the unloading operation.

In FIG. 5, the braking arm 11 is set with the brakes off when the loading operation is performed for respective modes such as "UNLOAD, END", "STOP 1" and "HALF LOAD". The reason for this is that the pendulum gear 21 is engaged with the spur gear 17 of the supply-reel base 16 and the supply-reel base 16 is operated with brakes on in order to reduce a so-called full-top processing time. That is to say, in the full-top processing, the tape cannot be drawn from the take-up reel side while the tape tends to be drawn from the take-up reel side in a so-called TT fashion. For this reason, in order to reduce the full-top processing time, as shown in FIG. 1, the brakes are not applied to the supply-reel base by the braking arm 11 but the pendulum gear 21 sets the supply-reel base 16 with brakes on to suppress the tape from being slackened. Then, by the rotation of the capstan gear 25, the pendulum gear 21 is detached from the supply-reel base 16, from which the tape can be drawn.

In "DEW" mode, there is shown a dew detected position. As a method of mechanically detecting a dew, there is known such a method that a tape is brought in slight contact with a drum and then the drum is rotated. For example, if a dew is produced on the drum, the tape sticks to the drum and therefore the drum cannot be rotated. To this end, if the supply-reel base 16 is operated with the brakes off, then the tape is drawn from the supply-reel base 16 so that the supply-reel base 16 is operated with the brakes on.

Under the loading and unloading conditions in respective modes such as "STOP 2", "FWD", "RVS, P" and "RVS", since the tape is set in the respective tape travel modes such as "PB (playback)", "STOP", "CUE" and "REV", the supply-reel base 16 is set with the brakes off.

As described above, according to the reel base braking mechanism of the present invention, since the pin 13 of the braking arm 11 is operated along the plane cam mechanism 5 in gang with the slide operation of the slide plate 2 on which the plane cam mechanism 5 is formed upon loading and unloading, and a timing at which the supply-reel base 16 is operated with brakes on and brakes off is controlled by rotating the braking arm 11, the number of assembly parts can be reduced as compared with the conventional braking mechanism and the manufacturing cost can be reduced considerably. Accuracy of the braking timing can be improved and the reel base braking mechanism of the present invention can be made high in reliability.

As set forth above, according to the reel base braking mechanism of the present invention, since the click portion of the braking arm operates to make the reel base with brakes on and off in a ganged relation to the operation that the pin of the braking arm is selectively engaged into the two guide grooves and thereby swung in accordance with the linear movement of the slide plate and the braking timing at which the reel base is operated with braking on and off is controlled in response to the positions of the respective modes of the tape loading and the unloading, the number of assembly parts can be reduced as compared with those of the conventional braking mechanism and the manufacturing cost of this reel base braking mechanism can be reduced considerably. Furthermore, the braking timing of the reel base braking mechanism of the present invention can be improved in accuracy and the reel base braking mechanism can therefore be made high in reliability.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A reel base braking mechanism comprising:
   a slide plate slidable on a chassis along a straight line in conjunction with a tape loading operation and a tape unloading operation;
   a plane cam mechanism including a guide mechanism formed on said slide plate along its sliding direction said guide mechanism having first and second guide grooves which common to each other at at least at both ends thereof; and,
   a braking arm rotatably supported on said chassis, said braking arm having a pin formed on one end portion thereof for engaging said guide grooves of said guide mechanism, and further having a click portion formed on the other end portion thereof to be engaged or detached from a reel base, wherein said pin of said braking arm is selectively engaged with either of said two guide grooves to cause said braking arm to swing when said slide plate is moved along said straight line, so that said click portion of said braking arm is caused to engage or disengage said reel base thereby controlling the timing of a braking action during said tape loading and said tape unloading.

2. The reel base braking mechanism according to claim 1, wherein said reel base further comprises a ratchet mechanism for permitting said reel base to rotate in a tape rewinding direction when said click portion is engaged with said reel base.

3. The reel base braking mechanism according to claim 1, wherein a depth of said first guide groove on said slide plate to which a top of said pin of said braking arm comes in contact with is made different depending upon a movement position of said slide plate so that said pin traces selectively said first and second guide grooves in response to the sliding direction of said slide plate.

4. The reel base braking mechanism according to claim 1, wherein said braking arm is biased under spring force of a torsion spring in the direction such that said click portion is to be engaged with said reel base.

5. The reel base braking mechanism according to claim 4, wherein said torsion spring urges said pin of said braking arm in the direction in which said pin comes in contact with said guide grooves of said slide plate.

6. The reel base braking mechanism according to claim 4, wherein said reel base comprises a spur gear, and wherein said click portion of said braking arm is biased under spring force of said torsion spring so that said click portion is engaged with said spur gear.

* * * * *